Aug. 24, 1954

F. E. SEAMAN 2,687,331

PROJECTING APPARATUS

Filed March 5, 1952

Inventor
FRANCIS EUGENE SEAMAN

By George F. DesMarais
Attorney

Aug. 24, 1954

F. E. SEAMAN 2,687,331

PROJECTING APPARATUS

Filed March 5, 1952

Inventor
FRANCIS EUGENE SEAMAN
By George F. DesMarais
Attorney

Patented Aug. 24, 1954

2,687,331

UNITED STATES PATENT OFFICE 2,687,331

PROJECTING APPARATUS

Francis Eugene Seaman, Wharton, N. J., assignor to Lock Joint Pipe Company, East Orange, N. J., a corporation of New Jersey Application March 5, 1952, Serial No. 274,981

3 Claims. (Cl. 302—52)

This invention relates to the projecting or spraying of solids or particles of small size mixed with a liquid.

The apparatus of the present invention is capable of delivering a uniform, flowable stream of material consisting of small particles mixed with a liquid, for example, cement in water, or mortar, at any desired velocity. A quantity or body of the material is contained within a closed chamber. A carrying vehicle in the nature of an inert gas, such as air, is supplied to the chamber through a pipe opening within the body of the material. The air is directed under pressure from the pipe toward the lower end of a substantially vertical space or passage which is long in comparison to its diameter and is best formed as a conduit or tube. The upper end of the tube opens to a clear pressurized space above the level of the body of the material contained within the chamber. The air discharging from the pipe and entering the lower end of the tube continuously entrains some of the material from the body of material and lifts the entrained material within the hollow passage provided by the tube.

A portion of the material which is carried upwardly within the tube is directed into an inlet of a discharge conduit through which the aerated material is conveyed outwardly of the chamber and to a discharge nozzle. The flow of material through the discharge conduit is accelerated by a continuous flow of air under pressure from the space above the body of the material to a second inlet or opening in the discharge conduit. The mixture of material and air received from the tube enters the discharge conduit crosswise of the flow of the accelerating air in which it is intermingled and carried forward to the discharge nozzle.

Material may be forcibly projected or sprayed at a uniform rate so long as the level of the body of the material within the chamber is located above the lower end of the vertically disposed tube. For maintaining uniformity of the consistency of the material being sprayed, and in order to prevent settling of suspended solids, it is desirable to cause recirculation of the material within the chamber. This is accomplished, in part, by a separation between the discharge end of the tube and the most proximate inlet to the discharge conduit, so that some of the material carried upwardly through the tube is returned to the body of material within the chamber for descent therewith and re-entrainment by air entering the lower end of the tube. The apparatus is a continually operating apparatus so long as air is introduced to the body of material and to the lower end of the tube, and other air is introduced to the space above the level of the material.

The two air-supplying conduits may be provided with air from a single source of supply or from separate sources, but in any case, the pressure of the air entering the lower end of the chamber should be at least equal to or greater than the pressure of the air entering the space above the body of material in the chamber. Means are provided for adjusting the pressure of the air being supplied to the chamber by the two supply conduits to secure the best operating conditions for the consistency and character of the material to be projected, and to secure a desired coating of the solids of the material.

In the embodiment of the invention illustrated in the drawing, there is a main shut-off valve for temporarily shutting down the supply of air to the lower and upper portions of the chamber between projecting operations.

To prevent the settling of solids within the body of material during and between projecting operations there is a pipe line which connects the main source of air supply with the pipe connecting with the chamber and through which a flow of air to the lower end of the tube is continuously maintained. This line by-passes air around a reducing valve leading to the pipe connected to the lower end of the chamber. The line is provided with a cock for regulating the amount of air by-passed. The cock is adjusted before the cover of the pressurized chamber is sealed in place at the beginning of a projecting operation so as to assure a continuous circulation of the material at all times so long as there is material within the chamber.

Further and other objects of the present invention will be hereinafter set forth in the accompanying specification and claims and illustrated in the drawing which shows a preferred embodiment of the principle of the invention and what I now consider to be the best mode in which I have contemplated applying that principle.

In the drawing, Fig. 1 is a section on the vertical axis of a pressure chamber;

Figure 1:
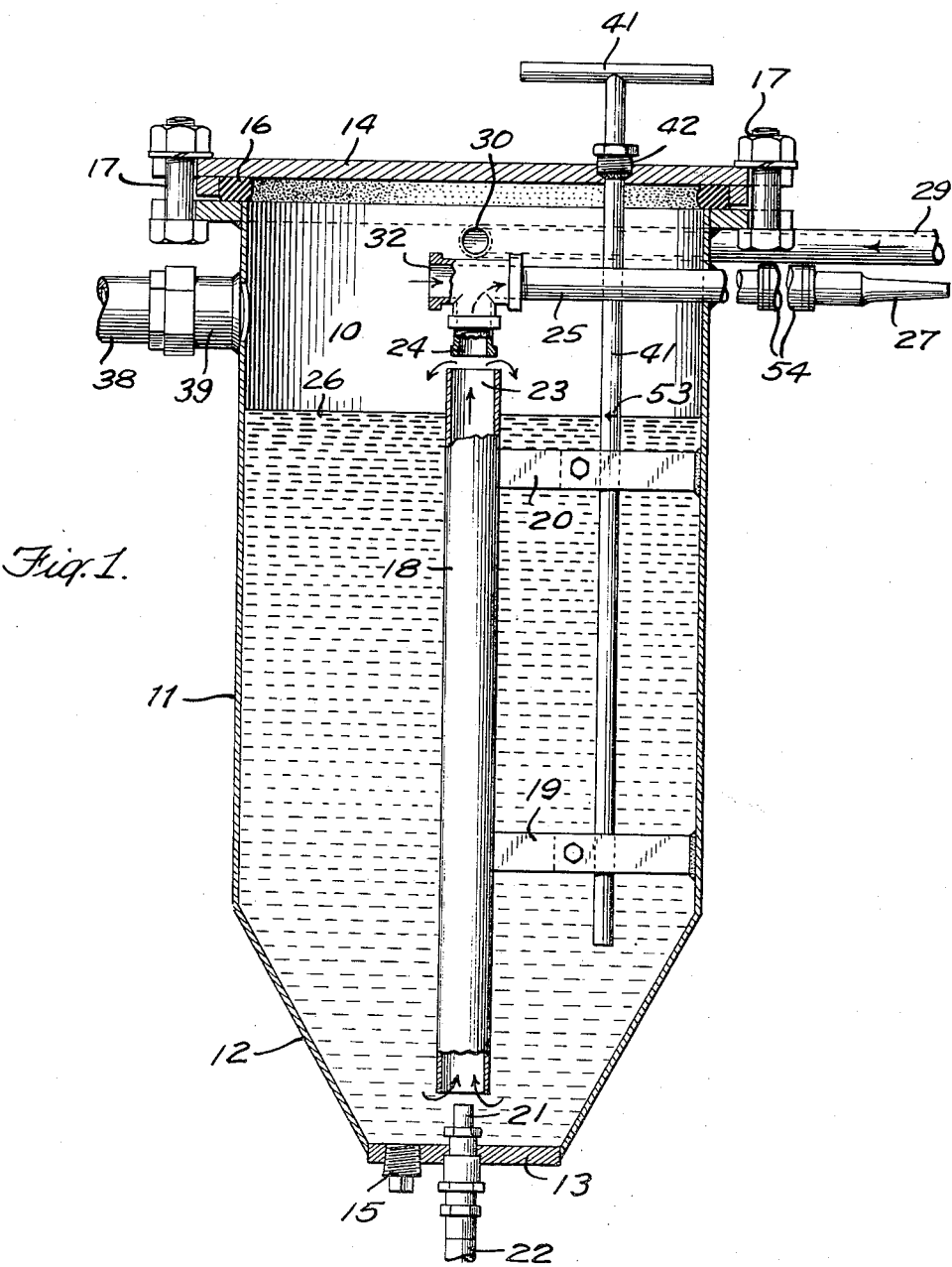

As illustrated in Fig. 1, the pressurized chamber 10 includes a vessel 11 having an inwardly sloping lower portion 12, a plate 13 comprising a bottom wall, and a removable cover 14. A threaded drain plug 15 is provided for enabling cleaning of the vessel. The cover 14 is pressed into sealing relationship with a gasket 16 by means of a plurality of bolts 17. The vessel is provided with openings for the connection of conduits to its interior, as will be explained in more detail hereinafter.

The tubular space within the chamber 10 through which the material is elevated is provided in the form of a tube or conduit 18 located centrally of the chamber and substantially vertically disposed. The tube is supported by a number of brackets 19 and 20. The lower end of the tube 18 is open and provides an ingress for the entry of aerated material to the tube. This ingress is located adjacent the discharge opening of a pipe 21 connected with a pressure supply conduit 22 through the bottom wall 13. The size and location of the discharge opening of the pipe 21 is such as to cause delivery of all of the air leaving the pipe to the ingress at the lower end of the tube 18 and entrainment of the material which is immediately accessible to the lower end of the tube. Preferably, the discharge end of the pipe 21 is smaller than the lateral expanse of the ingress to the tube 18 and is located coaxially therewith and spaced from the lower end of the tube.

The upper end or egress 23 of the tube 18 is located to discharge directly toward an orifice or inlet 24 in a discharge conduit 25 which passes through the wall of the vessel 11. This inlet 24 is proximate to the egress 23 of the tube 18 and is substantially coaxial with the tube. It is spaced from and is smaller than the egress 23. By employing a T connection the aerated material entering the inlet 24 is projected into and crosswise of the direction of flow of auxiliary air flowing through the discharge conduit 25. The arrangement is such that a portion of the material lifted through the tube will be impelled directly into the inlet 24, and the remaining portion will be directed outside of the inlet and permitted to return to the body of material 26 contained within the chamber.

Since the chamber 10 is sealed against outflow except through the discharge conduit the material entering the inlet 24 would be impelled through the discharge conduit 25 and a nozzle 27, but it has been discovered that the velocity of the flow of material can be more closely regulated by providing an auxiliary supply of air to the discharge conduit 25. The auxiliary air is supplied through a supply conduit 29 which enters the chamber 10 at an opening 30 to the space above the body of material 26. The air within this space is maintained at a pressure equal to or below the pressure of the air supplied by the conduit 22 to the lower end of the chamber. The air entering the chamber through the conduit 29 enters the discharge conduit 25 through an opening 32 which constitutes a second inlet thereto. The additional air provided in this manner picks up and intermingles with the stream of air and material entering the inlet 24 and accelerates the movement of the material through the discharge conduit 25.

Figure 2:
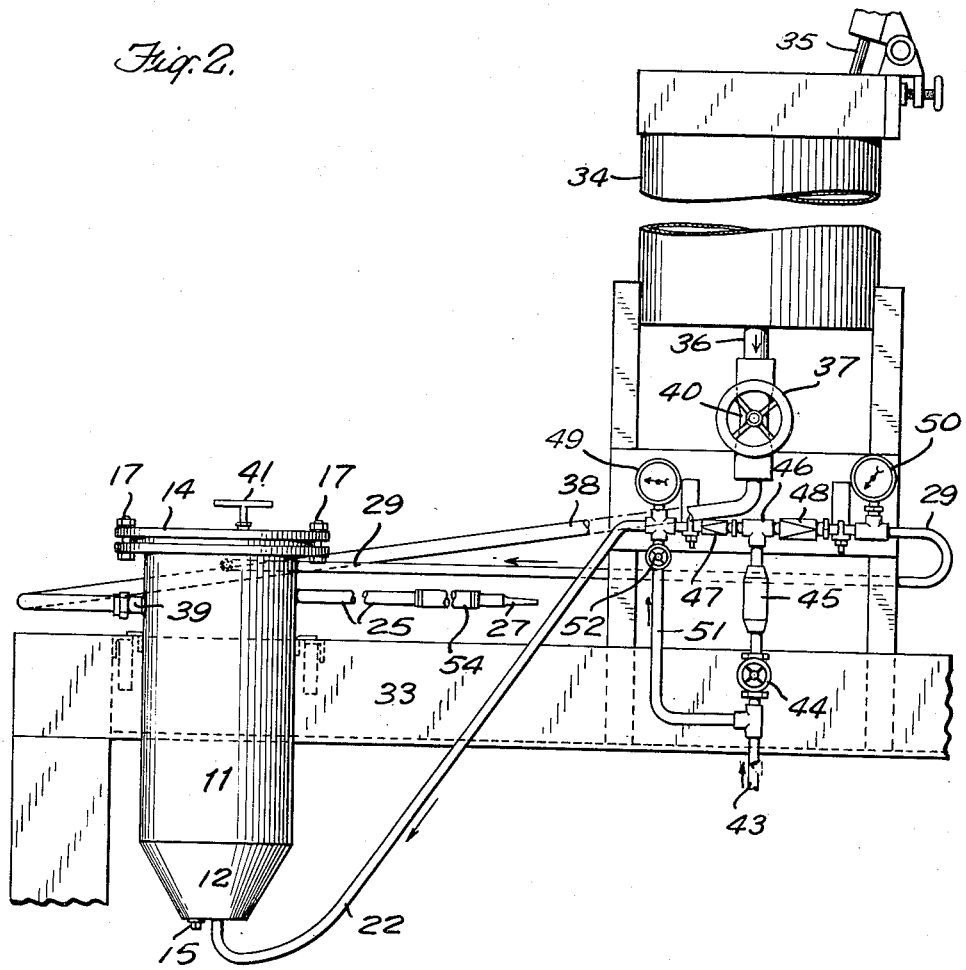
Fig. 2 is an elevation of the projecting apparatus.
Figure 3:
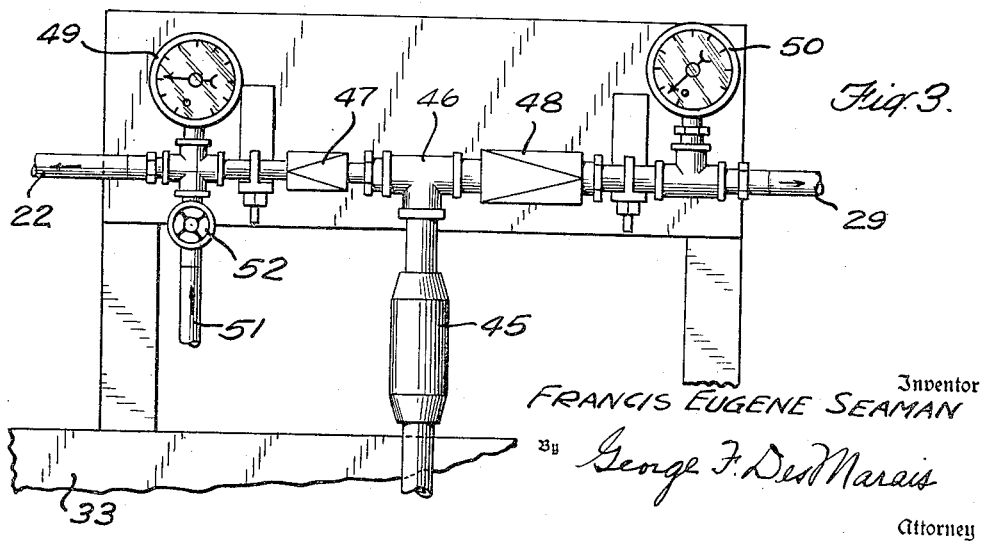
Fig. 3 is an enlarged view of the control panel.

The portion of the projecting apparatus thus far described may be used in connection with any appropriate devices for supplying the same with the material to be projected and with air under suitable pressures. As illustrated in Fig. 2, the vessel 11 is supported from a horizontal beam 33, to which is also mounted a material supply and mixing hopper 34. To the hopper there is mounted a motor (not shown) to which a stirring rod 35 is connected. The hopper discharges into a conduit 36 connected with a valve 37 by which the discharge of material to a conduit 38 may be controlled. The conduit 38 has a connection 39 for delivering material to the chamber 10. After the chamber 10, Fig. 1, has been supplied with a desired quantity of material, the valve 37 is closed. The valve 37 includes a flexible tube 40 which is constricted to shut off the supply of material to the conduit 38. The level of the material in the chamber 10 may be determined by a dip stick 41. This dip stick is provided with a bushing 42 for sealing the opening in the cover 14 through which the stick extends.

Pressurized air is supplied to the apparatus from a main air supply conduit 43 connected to a main shut-off valve 44, an air filter 45 and a T connection 46. One side of the T is connected to a pressure reducing valve 47 which is directly connected with the air supply conduit 22 extending to the lower end of the chamber 10. The other end of the T is connected with a pressure reducing valve 48 which is directly connected with the air supply conduit 29 extending to the upper portion of the chamber 10. The respective reducing valves are adjusted to provide pressure in the air supply conduit 22 at least equal to or greater than the pressure in the air supply conduit 29, and gauges 49 and 50 serve to assist in establishing the desired pressures. It is apparent that a difference in pressure could be obtained by omitting either one of the reducing valves or by substituting suitable hand-throttling valves in their stead.

The conduit 51 connects the main air supply conduit 43 on the supply side of the main shut-off valve 44 with the conduit 22 on the discharge side of the pressure reducing valve 47 for by-passing the main shut-off valve to provide a continuous supply of air to the conduit 22. This by-pass conduit 51 contains a cock 52 by which the amount of air by-passed to the conduit 22 may be controlled.

The system described is particularly efficacious for continuously projecting a thick grout consisting of cement and water. Predetermined quantities of the cement and water are introduced into the mixing and supply hopper 34 and stirred. The valve 37 is opened and then closed when the desired amount of the mixture has been supplied to the chamber 10. To avoid such overfilling as would cause the feed of an excessive amount of grout or the application of an uneven coating, the dip stick 41 is marked as at 53 to indicate a maximum level, but smaller quantities may be used, if desired. During the filling of the chamber, the cock 52 is cracked sufficiently to provide enough flow of air to lift material through the tube 18. After filling, the cover 14 is securely clamped in place. The cover can be maintained clamped until it is necessary to clean the apparatus—say four hours later when using ordinary cement. The main valve 44 is opened to pressurize the interior of the chamber.

The pressures in the air supply conduits 22 and 29 are obtained by the pressure reducing valves 47 and 48 which are set to obtain the desired operating conditions, such, for example, as 30 pounds per square inch and 25 pounds per square inch, respectively. It will be understood that the operating pressures selected are determinable by the character of the material to be projected, and the coating desired. The apparatus enables the use of relatively high pressures by which good penetration of a thick, flowable mixture of a cement grout is obtainable, as well as coatings in as dry a condition as possible.

The discharge conduit 25 is connected with and includes as a part thereof a flexible hose 54 which is also connected with a nozzle 27. The nozzle may be of any conventional type for directing material from the discharge conduit.

This invention is capable of numerous forms and various applications without departing from the essential features herein disclosed. It is therefore intended and desired that the specific description herein be deemed illustrative and not restrictive and that the patent shall cover all patentable novelty herein set forth; reference being had to the following claims rather than to the particular showing herein to indicate the scope of this invention.

What is claimed is:

1. Apparatus for projecting material consisting of small particles mixed with a liquid, said apparatus comprising a closed chamber for containing a body of said material, a pipe extending into said chamber for introducing gas to the body of material in said chamber, a tube extending upwardly through said body of material and having an ingress adjacent the discharge end of said pipe and an egress located in the upper portion of said chamber in the space above the level of said body of material, a material discharge conduit passing through a wall of said chamber and having an inlet adjacent said egress of said tube for receiving material therefrom and a second inlet open to said space for the entry of gas to said conduit, a conduit for supplying gas to said pipe, a conduit for supplying gas to said space, a source of supply of gas to said last two-named conduits, a shut-off valve for shutting off said source of supply, means including valves for controlling the pressures of the gas supplied to each of said gas-supplying conduits, and means connecting between said source of supply of gas and said first-named gas-supplying conduit for by-passing said shut-off valve for providing flow of gas from said source of supply to said first-named gas-supplying conduit so that material may be circulated upwardly through said tube irrespective of the shut-off of discharge of material from said chamber.

2. Apparatus for projecting material consisting of small particles mixed with a liquid, said apparatus comprising a closed chamber for containing a body of said material, a tube partially submerged in said body of material and having its upper end opening in the space above the level of said body of material, means for introducing gas under pressure to said body of material and including a pipe having its discharge end directed toward the lower end of said tube, means for supplying gas under pressure to said space including a conduit connected with said chamber above the level of said body of material, a discharge conduit for conducting material from said chamber, said discharge conduit having an opening to said space for receiving gas from said space, and a conduit connected with and intersecting said discharge conduit at a point intermediate said opening therein and the discharge end thereof, said last-named conduit having an inlet opposite the upper end of said tube for receiving material mixed with gas from said tube thereby to direct the mixture of said material and gas entering said inlet into the flow of gas through said discharge conduit.

3. In apparatus for projecting material consisting of small particles mixed with a liquid, the combination comprising a closed chamber for containing a body of said material, a tube extending upwardly through said body of material and having an ingress submerged in said material and an egress located above the level of said material, a pipe extending into said chamber and having an outlet submerged within said material and directed toward the ingress of said tube for directing gas and material into said tube, a material discharge conduit passing through a wall of said chamber and having an inlet spaced from and facing said egress of said tube for receiving gas and material from said tube and also having a second inlet opening directly to the space above the level of said material, said second inlet being disposed in said conduit to conduct gas into said conduit from said space in advance of the material entering said conduit through said first inlet, whereby material lifted into said first inlet from said tube is intermingled with gas from said space, means for supplying gas under a predetermined pressure to said pipe, a pressure supply for maintaining said space above said material filled with gas under a pressure different from the pressure of gas supplied to said pipe, and conduit means connecting said source of pressure supply to said chamber to cause the flow of gas from said space into said second inlet to said material discharge conduit.

References Cited in the file of this patent

UNITED STATES PATENTS

| Number | Name | Date |
|---|---|---|
| 1,942,379 | Thompson | Jan. 2, 1934 |
| 2,603,462 | Brown | July 15, 1952 |